United States Patent
Iwao et al.

(10) Patent No.: US 11,460,163 B2
(45) Date of Patent: Oct. 4, 2022

(54) VEHICLE LAMP BODY DEVICE

(71) Applicant: HONDA MOTOR CO., LTD., Tokyo (JP)

(72) Inventors: Shunsuke Iwao, Wako (JP); Daisuke Nakashima, Wako (JP); Hiroya Ohkubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/668,164

(22) Filed: Feb. 9, 2022

(65) Prior Publication Data

US 2022/0268417 A1    Aug. 25, 2022

(30) Foreign Application Priority Data

Feb. 18, 2021 (JP) .............................. JP2021-024104

(51) Int. Cl.
*F21S 43/237* (2018.01)
*F21S 43/245* (2018.01)

(52) U.S. Cl.
CPC ........... *F21S 43/237* (2018.01); *F21S 43/245* (2018.01)

(58) Field of Classification Search
CPC ...... G02B 6/001; F21S 43/237; F21S 43/241; F21S 43/245; F21S 43/251
See application file for complete search history.

(56) References Cited

U.S. PATENT DOCUMENTS

| | | | |
|---|---|---|---|
| 9,776,552 B2 * | 10/2017 | Soenen ................ | B60Q 1/2607 |
| 9,995,451 B2 * | 6/2018 | Brosinger ................ | B60Q 1/34 |
| 10,876,703 B2 * | 12/2020 | Sakashita .............. | F21S 43/245 |
| 2010/0238678 A1 * | 9/2010 | Lin ...................... | G02B 6/0006 |
| | | | 362/551 |

FOREIGN PATENT DOCUMENTS

JP    2013-216290 A    10/2013

* cited by examiner

*Primary Examiner* — Matthew J. Peerce
(74) *Attorney, Agent, or Firm* — Rankin, Hill & Clark LLP (57) ABSTRACT

In a vehicle lamp body device provided with a first light source arranged at a center of a base and second light sources arranged at both ends of the base, the device includes a first lightguide rod configured to branch and guide light from the first light source to an outside of both ends of the base and a second lightguide rod configured to guide light from the second light sources to the outside of both ends of the base respectively, the first lightguide rod and the second lightguide rod are superimposed in a light emission direction on the outside of both ends of the base and optical paths of the first lightguide rod and the second lightguide rod are merged.

5 Claims, 7 Drawing Sheets

VEHICLE LAMP BODY DEVICE

INCORPORATION BY REFERENCE

The present application claims priority under 35 U.S.C. § 119 to Japanese Patent Application No. 2021-024104 filed on Feb. 18, 2021. The content of the application is incorporated herein by reference in its entirety.

BACKGROUND OF THE INVENTION

Field of the Invention

The present invention relates to a vehicle lamp body device.

Description of the Related Art

Conventionally, a vehicle lamp body device such as a high-mount stop lamp which is arranged at an upper part of a rear part of a vehicle and is lighted when the vehicle is braked has been known (Japanese Patent Laid-Open No. 2013-216290).

The vehicle lamp body device is generally configured to include a first light source arranged at a center of a base and second light sources arranged at both ends of the base, guide light from the individual light sources in a vehicle width direction by two lightguide rods and emit the light to the back of a vehicle body.

SUMMARY OF THE INVENTION

However, in the conventional configuration, since the light from the light sources is guided in the vehicle width direction by two lightguide rods, loss of light quantity is generated and luminance of the lightguide rods declines. Since the two lightguide rods are visible from the back of the vehicle body, there is no sense of unity with the vehicle body and it is a blight in terms of design.

The present invention is implemented in consideration of the problem described above, and an object is to provide a vehicle lamp body device capable of suppressing loss of light quantity and obtaining a sense of unity with a vehicle body.

In order to achieve the above-described object, for an aspect of the present invention, in a vehicle lamp body device provided with a first light source arranged at a center of a base and second light sources arranged at both ends of the base, the device includes a first lightguide rod configured to branch and guide light from the first light source to an outside of both ends of the base and a second lightguide rod configured to guide light from the second light sources to the outside of both ends of the base respectively, the first lightguide rod and the second lightguide rod are superimposed in a light emission direction on the outside of both ends of the base and optical paths of the respective lightguide rods are merged.

For the aspect of the present invention, in the vehicle lamp body device, a branching part which is a branching position of the first lightguide rod may be provided with at least one of a light reflector arranged behind the branching part and a light diffusion lens arranged in front of the branching part.

For the aspect of the present invention, in the vehicle lamp body device, an emission side shape before merging of the second lightguide rod may be formed in a step shape.

For the aspect of the present invention, in the vehicle lamp body device, an emission side shape before superimposition of the first lightguide rod may be formed in a step shape.

For the aspect of the present invention, in the vehicle lamp body device, the first lightguide rod and the second lightguide rod are configured such that a cross-sectional area and a lightguide cut surface do not change before and after merging.

According to the aspect of the present invention, a vehicle lamp body device capable of suppressing loss of light quantity, obtaining a sense of unity with a vehicle body and improving design can be provided.

DETAILED DESCRIPTION OF THE PREFERRED EMBODIMENT

Hereinafter, the present embodiment will be described with reference to the drawings.

Figure 1:
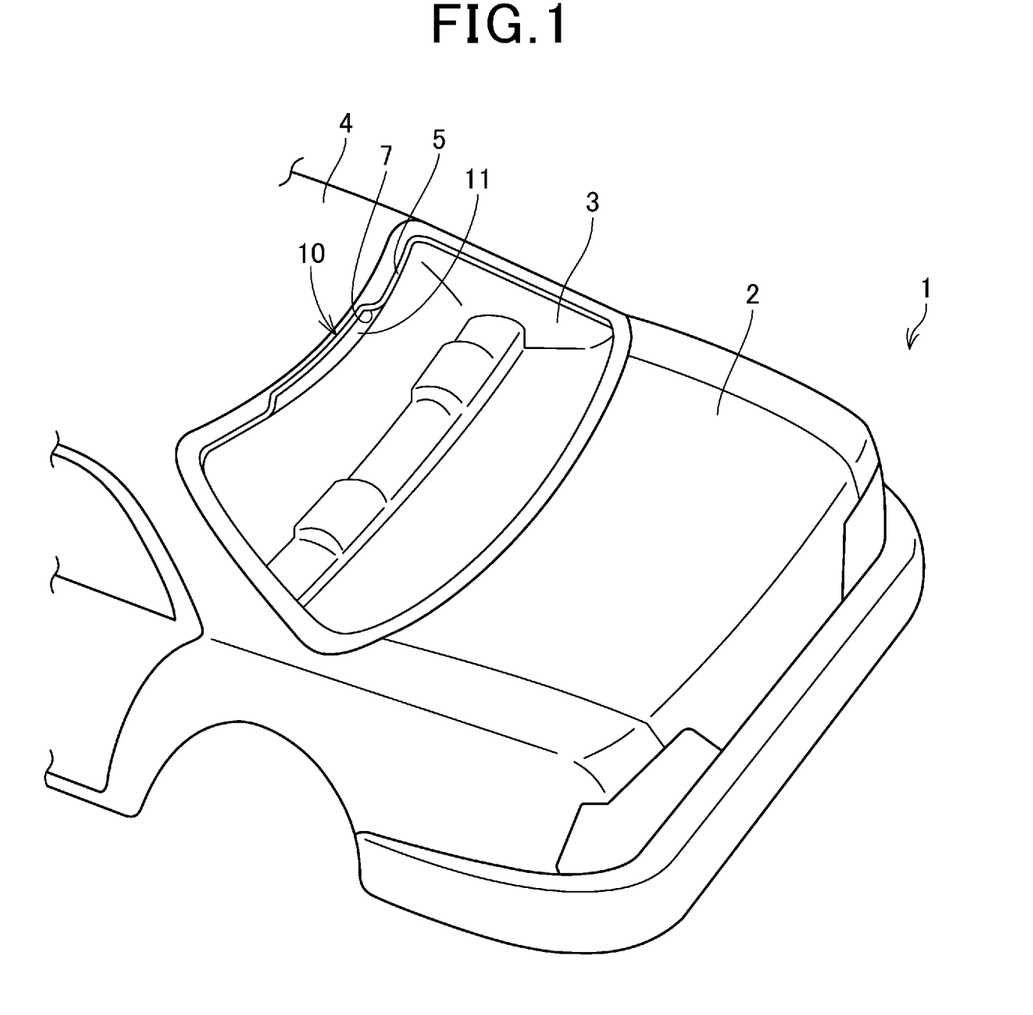
FIG. 1 is a perspective view of a vehicle loaded with a vehicle lamp body device relating to a present embodiment.

FIG. 1 is a perspective view of a vehicle 1 loaded with a vehicle lamp body device relating to the present embodiment.

As illustrated in FIG. 1, a rear part of the vehicle 1 such as an automobile is provided with a trunk lid 2, a rear window 3 and a garnish 5.

The rear window 3 is arranged between the trunk lid 2 and a ceiling panel 4 forming a ceiling of the vehicle 1 in a vehicle height direction of the vehicle 1. The garnish 5 is provided between an upper edge of the rear window 3 and the ceiling panel 4. The garnish 5 is a long planar member extending along the entire upper edge of the rear window 3. Roughly on a center in a vehicle width direction of the garnish 5, a stop lamp 10 is provided. The stop lamp 10 is a so-called high-mount stop lamp. The stop lamp 10 is housed in a recessed part 6 of the garnish 5, and an opening 7 of the recessed part 6 is closed by a lens 11. The recessed part 6 is a lamp housing of the stop lamp 10, and the opening 7 is an emission opening for light of the stop lamp 10.

The stop lamp 10 corresponds to an example of the vehicle lamp body device. The stop lamp 10 is energized and lighted in response to a stepping operation of a brake pedal or the like and functions as a brake light which reports a brake state to a following vehicle or the like.

Figure 2:
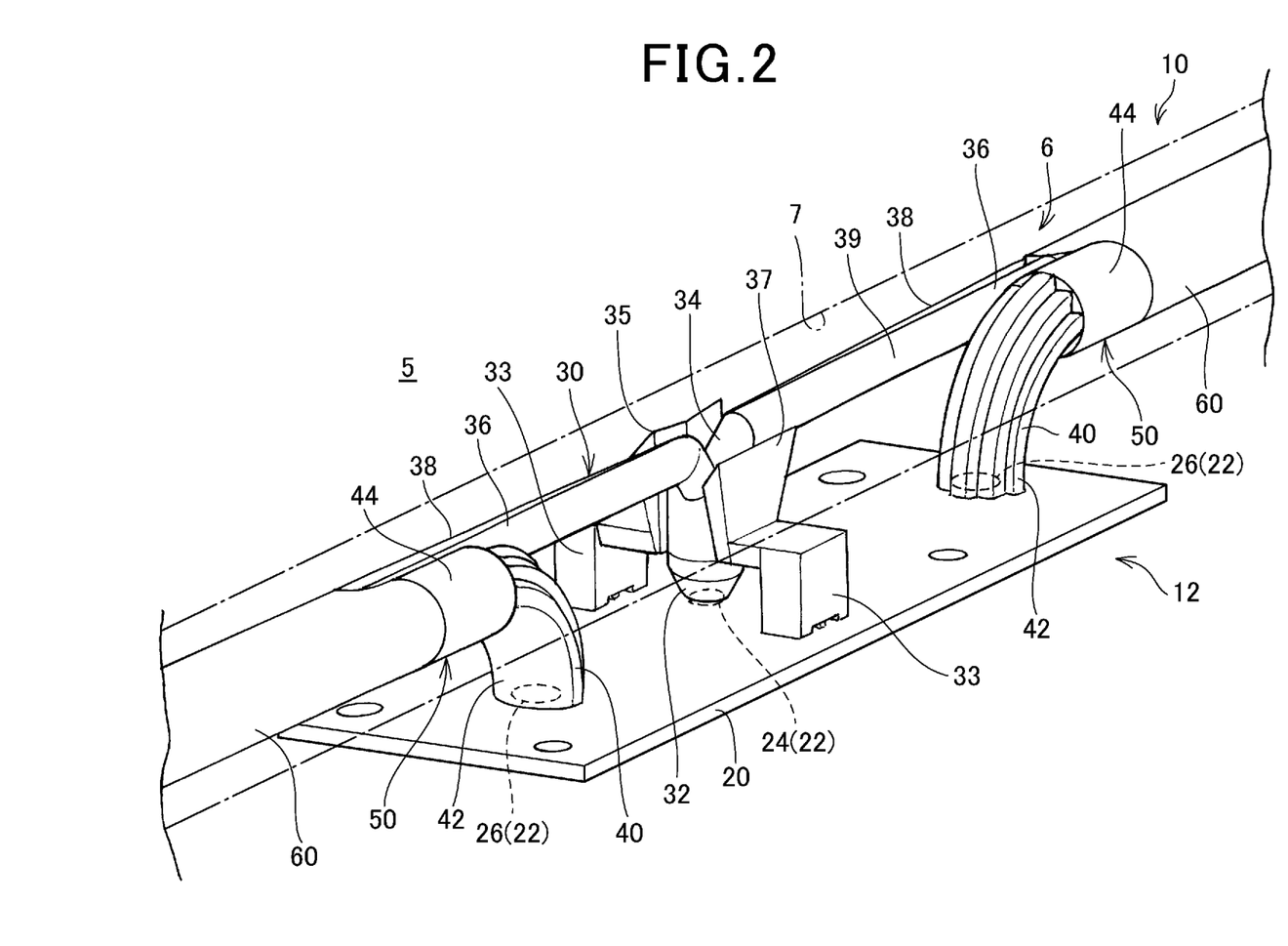
FIG. 2 is a perspective view illustrating an internal structure of the vehicle lamp body device.

FIG. 2 is a perspective view illustrating an internal structure of the stop lamp 10.

In the recessed part 6 of the garnish 5, a lamp unit 12 configuring a light emission part of the stop lamp 10 is housed. The lamp unit 12 includes a circuit board 20. The circuit board 20 is arranged at the almost center in the vehicle width direction of the vehicle 1.

On the surface of the circuit board 20, three LEDs 22 and a drive circuit which drives the LEDs 22 or the like are mounted. The circuit board 20 functions as a base of the stop lamp 10. The LEDs 22 are light emitting elements of a COB (Chips on Board) type or an SMD (Surface Mount Device) type for example.

The LEDs 22 include a first LED 24 and second LEDs 26. The first LED 24 is arranged at the almost center in a longitudinal direction of the circuit board 20 and the second LEDs 26 are arranged at both ends in the longitudinal direction of the circuit board 20. In addition, the first LED 24 is arranged on a front side of the vehicle 1 in a direction orthogonal to the longitudinal direction of the circuit board 20 and both of the individual second LEDs 26 are arranged on a rear side of the vehicle 1, that is on the side of the opening 7, in the direction orthogonal to the longitudinal direction of the circuit board 20. The LEDs 22 function as a first light source and second light sources of the stop lamp 10.

To an upper surface of the first LED 24, a first lightguide rod 30 is connected. The first lightguide rod 30 is a long lightguide body which is formed of a transparent resin for example and a cross section of which is circular and solid. The first lightguide rod 30 is the lightguide body so called a lightguide which guides light made incident on one end to the other end by internal reflection. The first lightguide rod 30 guides the light emitted from the first LED 24 over an entire length of the first lightguide rod 30 by reflecting the light inside. That is, the first lightguide rod 30 includes an optical path in the solid inside.

The first lightguide rod 30 is connected to the first LED 24 by a connecting end 32 which is one end covering an upper surface of the first LED 24. The first lightguide rod 30 is provided with a pair of leg parts 33 branched from both ends of the connecting end 32 along a front-back direction of the vehicle 1. The leg parts 33 are connected to the upper surface of the circuit board 20 and support the first lightguide rod 30.

The first lightguide rod 30 is provided with a branching part 34 which is a branching position where the first lightguide rod 30 is branched in two directions along the vehicle width direction after being extended upwards from the connecting end 32. The branching part 34 is formed in a V shape in a view from the front-back direction of the vehicle 1.

Thus, in the lamp unit 12, light quantity of the first LED 24 can be roughly uniformly distributed to the first lightguide rod 30 branched in the vehicle width direction.

On the front side of the vehicle 1 of the branching part 34, a reflector 35 is provided. The reflector 35 functions as a light reflector which reflects the light leaking out from the branching part 34 to the side of the opening 7.

Similarly, on the rear side of the vehicle 1 of the branching part 34, a branching part lens 37 is provided. The branching part lens 37 scatters the light leaking out from the branching part 34 to the side of the opening 7. That is, the branching part lens 37 functions as a light diffusion lens which diffuses the light emitted from the branching part 34.

Thus, at the branching part 34 formed in the V shape, decline of the light quantity emitted to the side of the opening 7 can be suppressed. In addition, generation of a part where the light quantity declines can be suppressed over the entire longitudinal direction of the stop lamp 10.

The first lightguide rod 30 branched at the branching part 34 is extended to the outside of both ends of the circuit board 20. Hereinafter, the first lightguide rod 30 branched at the branching part 34 and extended to the outside of the circuit board 20 is defined as a branched lightguide rod 36. The individual branched lightguide rod 36 is, similarly to the first lightguide rod 30, a long member the cross section of which is roughly circular.

The light emitted from the first LED 24 and guided by the first lightguide rod 30 is reflected at an angle smaller than a critical angle to a surface facing the opening 7 by being reflected on a reflection surface 38 of the individual branched lightguide rod 36, and thus emitted from an emission surface 39 of the branched lightguide rod 36 facing the opening 7.

The reflection surface 38 is provided with a plurality of notched structures such as V-shaped grooves and gratings to be a prism cut for example.

Note that, on the reflection surface 38 of the individual branched lightguide rod 36, the plurality of notched structures are provided on a part from the branching part 34 to a respective position adjacent to each of the second LEDs 26 at narrower intervals compared to the part extending from the position adjacent to the second LED 26 to the outside of the circuit board 20.

To both of upper surfaces of the individual second LEDs 26, a second lightguide rod 40 is connected. The individual second lightguide rod 40 is a circular, solid and long lightguide body formed of a transparent resin or the like similarly to the first lightguide rod 30. That is, the second lightguide rod 40 includes an optical path in the solid inside similarly to the first lightguide rod 30.

The second lightguide rod 40 of the present embodiment is formed in a larger diameter than the first lightguide rod 30.

The individual second lightguide rod 40 is connected to the second LED 26 by a connecting end 42 which is one end covering the upper surface of the second LED 26. The individual second lightguide rod 40 is extended while being curved in an arch shape upwards from the connecting end 42. An outer peripheral surface of a part curved in the arch shape of the individual second lightguide rod 40 is formed in a step shape. At the part curved in the arch shape of the second lightguide rod 40, a plurality of planes facing the front-back direction of the vehicle 1 are formed.

The individual second lightguide rods 40 are curved in the arch shape and then extended in directions opposite to each other toward the outside of both ends of the circuit board 20 respectively along the vehicle width direction of the vehicle 1.

Figure 3:
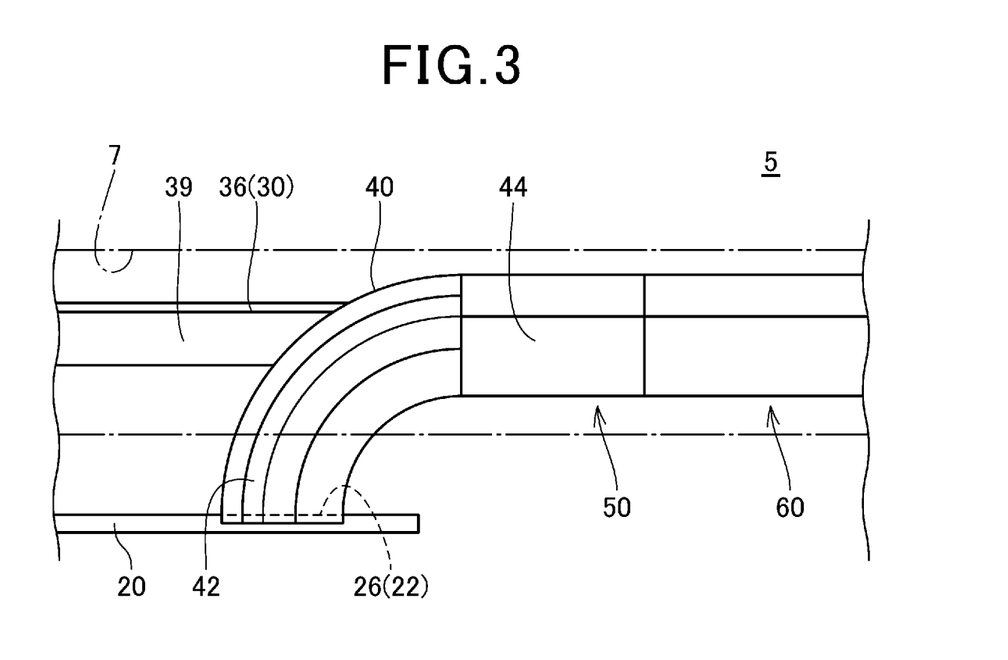
FIG. 3 is a front view illustrating a merging part of a first lightguide rod and a second lightguide rod.

FIG. 3 is a front view illustrating a merging part 50 of the first lightguide rod 30 and the second lightguide rod 40.

Hereinafter, one branched lightguide rod 36 and one second lightguide rod 40 will be described but the other branched lightguide rod 36 and the other second lightguide rod 40 are also similarly configured.

As illustrated in FIG. 3, on the outside of the circuit board 20, the branched lightguide rod 36 and the second lightguide rod 40 extended in the same direction are arranged so as to be superimposed in the light emission direction in the view from the side of the opening 7.

That is, in the view from the side of the opening 7, the branched lightguide rod 36 is arranged behind the second lightguide rod 40.

Figure 4:
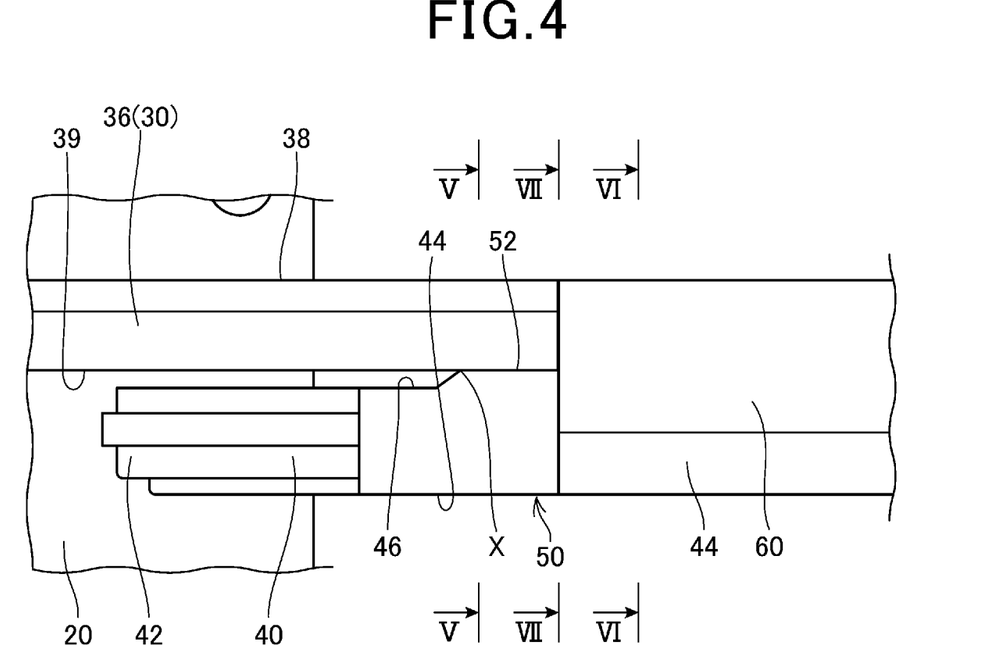
FIG. 4 is a top view illustrating the merging part of the first lightguide rod and the second lightguide rod.

FIG. 4 is a top view illustrating the merging part 50 of the first lightguide rod 30 and the second lightguide rod 40.

As illustrated in FIG. 4, on the outside of both ends of the circuit board 20, the branched lightguide rod 36 and the second lightguide rod 40 are extended in a predetermined length dimension along the vehicle width direction of the vehicle 1 and then joined at a merging position X and the optical paths are merged. The part where merging is started is defined as the merging part 50.

The emission surface 39 of the branched lightguide rod 36 and a facing surface 46 of the second lightguide rod 40 facing the emission surface 39 are joined. A joined surface is formed in a planar shape parallel to the vehicle height direction of the vehicle 1.

Thus, the light emitted from the emission surface 39 of the branched lightguide rod 36 is made incident on the inside of the second lightguide rod 40 from the facing surface 46, and is emitted from a surface positioned on an opposite side of the facing surface 46 of the second lightguide rod 40. Therefore, the light emitted from the emission surface 39 of the branched lightguide rod 36 can be emitted from the opening 7 as irradiation light of the stop lamp 10 without being cut off by the second lightguide rod 40.

Hereinafter, the surface positioned on the opposite side of the facing surface 46 of the second lightguide rod 40 is defined as an emission surface 44.

Figure 5:
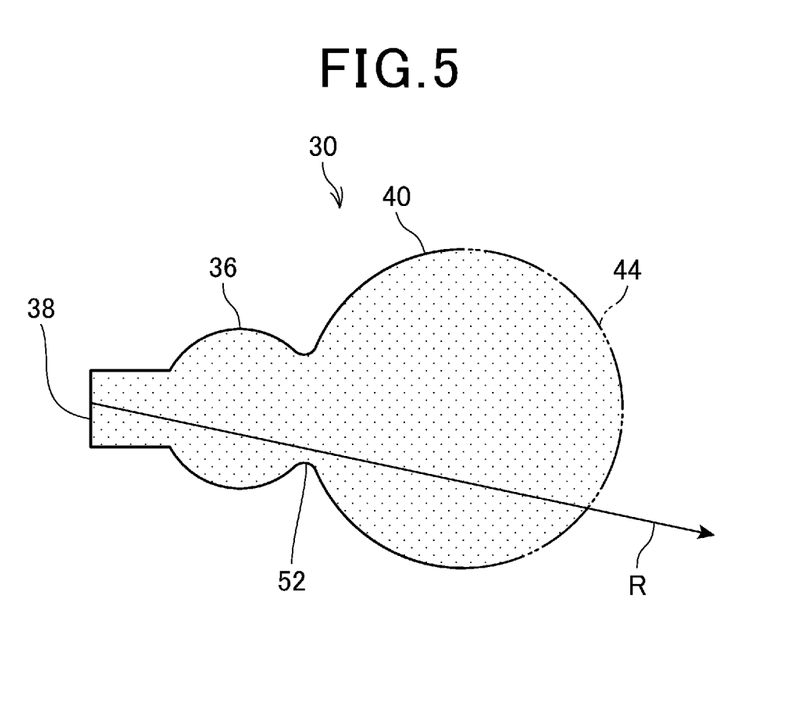
FIG. 5 is a V-V sectional view of FIG. 4.

FIG. 5 is a V-V sectional view of FIG. 4. In FIG. 5, for description convenience, the emission surface 44 is illustrated by a two-dot chain line. In addition, in FIG. 5, a cross section of the merging part 50 is illustrated by providing dots.

In the merging part 50, the branched lightguide rod 36 and the second lightguide rod 40 are joined, the optical paths are merged, and the predetermined length dimension is provided along the vehicle width direction of the vehicle 1. In the merging part 50, the reflection surface 38 which continues from the branched lightguide rod 36 is formed. Similarly, in the merging part 50, the emission surface 44 which continues from the second lightguide rod 40 is formed.

The light emitted from the first LED 24 and guided by the first lightguide rod 30 and the light emitted from the second LED 26 and guided by the second lightguide rod 40 are reflected on the reflection surface 38 when reaching the merging part 50. Reflected light R which is the light reflected on the reflection surface 38 is reflected at the angle smaller than the critical angle to the surface facing the opening 7 and thus emitted from the emission surface 44 of the merging part 50 to the outside of the merging part 50.

That is, in the merging part 50, the respective optical paths of the first lightguide rod 30 and the second lightguide rod 40 are merged and integrated.

The merging part 50 is provided with a connection part 52 which is a part where the emission surface 39 and the facing surface 46 are connected. As illustrated in FIG. 5, in the merging part 50, a height dimension is reduced at the connection part 52 in the vehicle height direction of the vehicle 1.

Figure 6:
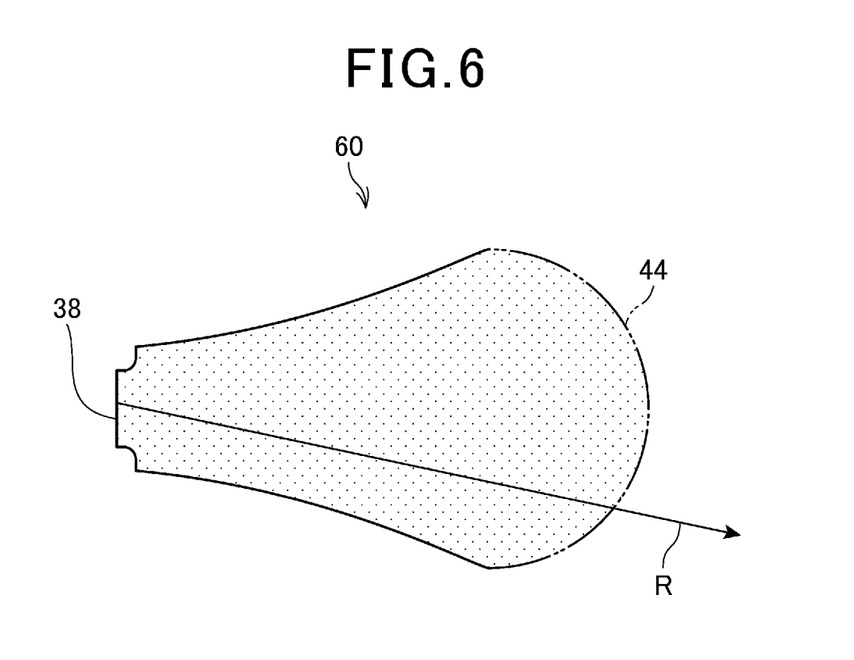
FIG. 6 is a VI-VI sectional view of FIG. 4.

FIG. 6 is a VI-VI sectional view of FIG. 4. In FIG. 6, the cross section of an integration part 60 is illustrated by providing dots.

In the longitudinal direction of the branched lightguide rod 36 and the second lightguide rod 40, the integration part 60 connected to be more integrated after being merged in the merging part 50 is formed.

For the integration part 60, an upper surface and a lower surface are formed in the planar shape that continues along the front-back direction of the vehicle 1 and thus the cross section is formed in a roughly wedge shape.

The integration part 60 is formed from the merging part 50 to the end of the opening 7 in the vehicle width direction of the vehicle 1.

In the integration part 60, the reflection surface 38 which continues from the branched lightguide rod 36 and the merging part 50 is formed. Similarly, in the integration part 60, the emission surface 44 which continues from the second lightguide rod 40 and the merging part 50 is formed.

The light emitted from the first LED 24 and guided by the first lightguide rod 30 and the light emitted from the second LED 26 and guided by the second lightguide rod 40 are reflected on the reflection surface 38 when reaching the integration part 60. The reflected light R which is the light reflected on the reflection surface 38 is emitted from the emission surface 44 of the integration part 60 to the outside of the integration part 60.

That is, in the integration part 60, the respective optical paths of the first lightguide rod 30 and the second lightguide rod 40 are merged and integrated.

In the integration part 60, since the cross section is formed in the roughly wedge shape as described above, the connection part 52 is not provided. Therefore, in the integration part 60, the Reflected light R can be emitted more efficiently.

Figure 7:
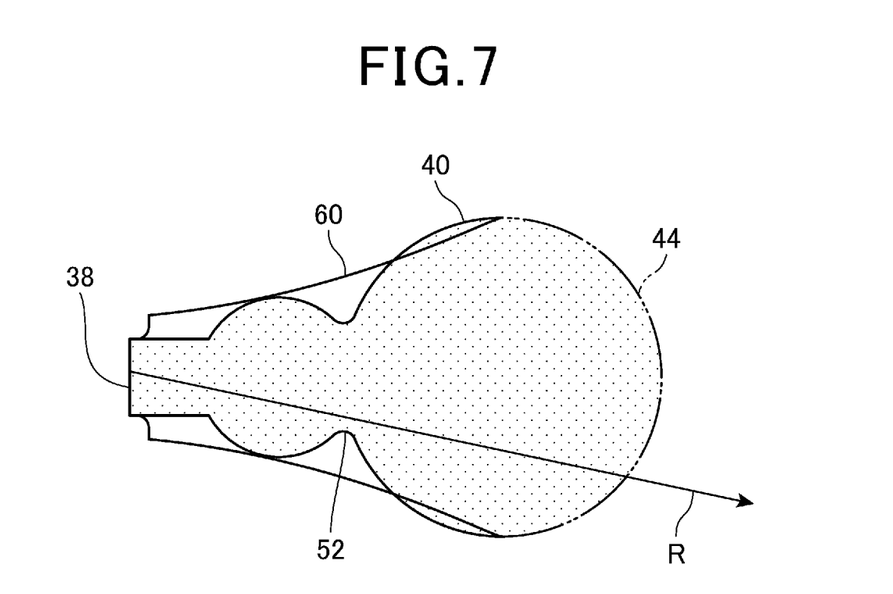
FIG. 7 is a VII-VII sectional view of FIG. 4.

FIG. 7 is a VII-VII sectional view of FIG. 4. In FIG. 7, the cross section of the merging part 50 is illustrated by providing dots.

As illustrated in FIG. 7, the merging part 50 and the integration part 60 include the same reflection surface 38 and emission surface 44.

In addition, the reflection surface 38 continues from the branched lightguide rod 36 and the emission surface 44 continues from the second lightguide rod 40.

Thus, in the lamp unit 12, a big change of light distribution between the merging part 50 and the integration part 60 can be suppressed. Therefore, in the stop lamp 10, the light distribution in the longitudinal direction is not greatly changed and more uniform light emission can be achieved.

Next, an effect of the present embodiment will be described.

The stop lamp 10 provided in the vehicle 1 is energized and lighted in response to the stepping operation of the brake pedal or the like and reports the brake state to a following vehicle or the like.

In the stop lamp 10, the light emitted by the LEDs 22 which are the light sources is emitted to the side of the opening 7 while being guided by the first lightguide rod 30 and the pair of the second lightguide rods 40 along the longitudinal direction and thus, the light is linearly emitted.

In this way, in the stop lamp 10, by guiding the light of the plurality of LEDs 22 arranged at the almost center in the longitudinal direction of the stop lamp 10 by the first lightguide rod 30 and the individual second lightguide rods 40, the decline of the light quantity on both end sides of the stop lamp 10 can be suppressed. Therefore, in the stop lamp 10, the decline of the light quantity can be suppressed and the roughly uniform light distribution (light emission) can be achieved over the entire longitudinal direction.

In the present embodiment, in the view from the side of the opening 7, the first lightguide rod 30 and the individual second lightguide rods 40 are arranged so as to be superimposed in the emission direction.

Thus, the big change of a width of a light emission surface of the stop lamp 10 in the vehicle height direction of the vehicle 1 in the longitudinal direction of the stop lamp 10 can be suppressed. Therefore, in the stop lamp 10, design can be improved.

Further, the stop lamp 10 includes the merging part 50 and the integration part 60 where the first lightguide rod 30 and the individual second lightguide rods 40 arranged so as to be superimposed in the emission direction are merged such that the solid optical paths are integrated on both end sides of the stop lamp 10. Then, in the merging part 50 and the integration part 60, the light guided by the first lightguide rod 30 and the light guided by the individual second lightguide rods 40 are emitted from the same emission surface 44.

Thus, even in the case where the first lightguide rod 30 and the individual second lightguide rods 40 are arranged at the front and back, since the optical paths are integrated, loss of the light guided by the first lightguide rod 30 and the light guided by the individual second lightguide rods 40 can be suppressed. Therefore, in the stop lamp 10, the decline of the light quantity can be suppressed over the entire longitudinal direction.

As described above, according to the present embodiment, the stop lamp 10 includes the first LED 24 arranged at the center of the circuit board 20 and the second LEDs 26 arranged at both ends of the circuit board 20. The stop lamp 10 includes the first lightguide rod 30 which branches the light from the first LED 24 and guides the light to the outside of both ends of the circuit board 20 and the second lightguide rods 40 which guide the light from the second LEDs 26 to the outside of both ends of the circuit board 20 respectively. Then, in the stop lamp 10, on the outside of both ends of the circuit board 20, the first lightguide rod 30 and the second lightguide rod 40 are superimposed in the light emission direction and the optical paths of the first lightguide rod 30 and the second lightguide rod 40 are merged.

Accordingly, even in the case where the first lightguide rod 30 and the individual second lightguide rods 40 are arranged at the front and back, since the optical paths are integrated, the loss of the light guided by the first lightguide rod 30 and the light guided by the individual second lightguide rods 40 can be suppressed. Therefore, in the stop lamp 10, the decline of the light quantity can be suppressed over the entire longitudinal direction. Then, in the stop lamp 10, the light emission surface which is extended with almost the same light quantity along a vehicle body direction and is capable of obtaining a sense of unity with the vehicle body can be achieved.

In addition, in the present embodiment, the reflector 35 is arranged behind the branching part 34 of the first lightguide rod 30 and the branching part lens 37 is arranged in front of the branching part 34.

Accordingly, in the branching part 34 formed in the V shape, the decline of the light quantity emitted to the side of the opening 7 can be suppressed. In addition, the generation of the part where the light quantity declines can be suppressed over the entire longitudinal direction of the stop lamp 10.

Further, in the present embodiment, an emission side shape of the second lightguide rod 40 before being merged with the first lightguide rod 30 is formed in the step shape.

Accordingly, at the part curved in the arch shape of the second lightguide rod 40, the plurality of planes facing the front-back direction of the vehicle 1 are formed. Therefore, the light emitted from the second LED 26 and guided by the second lightguide rod 40 can be easily emitted to the outside of the second lightguide rod 40.

In addition, in the present embodiment, the individual cross-sectional areas of the first lightguide rod 30 and the second lightguide rod 40 roughly coincide.

Accordingly, in the stop lamp 10, the decline of the light quantity guided by the first lightguide rod 30 and the second lightguide rod 40 can be suppressed before and after merging of the first lightguide rod 30 and the second lightguide rod 40. Therefore, in the stop lamp 10, the decline of the light quantity can be suppressed over the entire longitudinal direction.

Further, in the present embodiment, a reflection surface shape of the first lightguide rod 30 roughly coincides before and after merging.

Accordingly, in the lamp unit 12, the big change of the light distribution of the merging part 50 and the integration part 60 can be suppressed. Therefore, in the stop lamp 10, the light distribution in the longitudinal direction is not greatly changed and the more uniform light emission can be achieved.

The embodiment described above illustrates one aspect of the present invention and arbitrary modifications and applications are possible without deviating from the gist of the present invention.

For example, in the embodiment described above, the facing surface 46 is formed in the planar shape parallel to the vehicle height direction of the vehicle 1. However, without being limited thereto, the facing surface 46 may be formed as a reflection surface provided with the plurality of notched structures such as V-shaped grooves and gratings to be the prism cut for example. Accordingly, the light emitted from the emission surface 39 of the branched lightguide rod 36 is made incident on the inside of the second lightguide rod 40 from the facing surface 46, scattered on the facing surface 46 together with the light guided to the second lightguide rod 40 further and emitted from the emission surface 44.

In addition, for example, in the embodiment described above, the reflector 35 is arranged behind the branching part 34 of the first lightguide rod 30 and the branching part lens 37 is arranged in front of the branching part 34. However, without being limited thereto, either one of the reflector 35 and the branching part lens 37 may be omitted in the branching part 34. Further, for example, the reflector 35 and the branching part lens 37 may be omitted in the branching part 34.

REFERENCE SIGNS LIST

1 Vehicle
7 Opening
10 Stop lamp (vehicle lamp body device)
12 Lamp unit
20 Circuit board
24 First LED (first light source)
26 Second LED (second light source)
30 First lightguide rod
32, 42 Connecting end
34 Branching part
35 Reflector (light reflector)
36 Branched lightguide rod
37 Branching part lens (light diffusion lens)
38 Reflection surface
39, 44 Emission surface
40 Second lightguide rod
46 Facing surface
50 Merging part
52 Connection part
60 Integration part
X Merging position

What is claimed is:

1. A vehicle lamp body device provided with a first light source arranged at a center of a base and second light sources arranged at both ends of the base, the device comprising:
   a first lightguide rod configured to branch and guide light from the first light source to an outside of both ends of the base and a second lightguide rod configured to guide light from the second light sources to the outside of both ends of the base respectively,
   wherein the first lightguide rod and the second lightguide rod are superimposed in a light emission direction on the outside of both ends of the base and optical paths of the first lightguide rod and the second lightguide rod are merged.

2. The vehicle lamp body device according to claim 1, wherein a branching part which is a branching position of the first lightguide rod is provided with at least one of a light reflector arranged behind the branching part and a light diffusion lens arranged in front of the branching part.

3. The vehicle lamp body device according to claim 1, wherein an emission side shape before merging of the second lightguide rod is formed in a step shape.

4. The vehicle lamp body device according to claim 1, wherein individual cross-sectional areas of the first lightguide rod and the second lightguide rod roughly coincide before and after merging.

5. The vehicle lamp body device according to claim 1, wherein a reflection surface shape of the first lightguide rod roughly coincides before and after merging.

\* \* \* \* \*